UNITED STATES PATENT OFFICE.

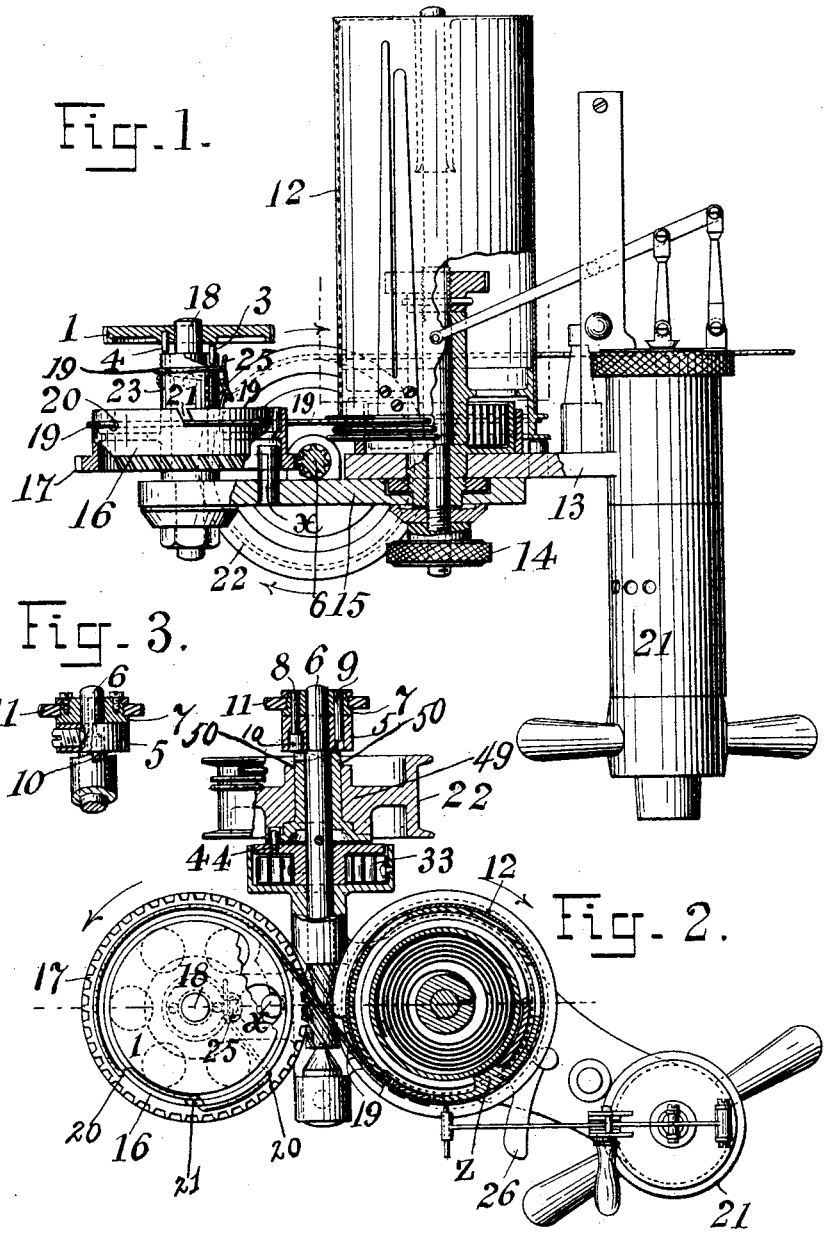

WILLIAM HOUGHTALING, OF BRIDGEPORT, CONNECTICUT, ASSIGNOR TO THE ASHCROFT MANUFACTURING COMPANY, OF SAME PLACE.

STEAM-ENGINE INDICATOR.

SPECIFICATION forming part of Letters Patent No. 538,043, dated April 23, 1895.

Application filed March 31, 1894. Serial No. 505,886. (No model.) Patented in England February 20, 1894, No. 3,627.

*To all whom it may concern:*

Be it known that I, WILLIAM HOUGHTA-LING, a citizen of the United States, residing at Bridgeport, in the county of Fairfield and State of Connecticut, have invented a new and useful Improvement in Steam-Engine Indicators, of which the following is a specification.

This invention forms a part of that described in British patent granted to me, dated February 20, 1894, and numbered 3,627.

It consists in an indicator having combined, with its diagram-barrel, an auxiliary barrel which is connected with the diagram-barrel so as to oscillate coincidently therewith, and is combined with a pulley from which it may be disconnected by a clutch-mechanism (substantially such as is shown in United States Letters Patent No. 494,482, granted to me March 28, 1893), the said pulley having wound thereon a cord that is to be hooked or attached to a reciprocating part of an engine.

The invention also consists in an auxiliary barrel which is provided with means for turning it, and consequently the connected diagram-barrel, slightly forward prior to effecting the clutch-engagement, so as to produce a sufficient tension on the cord to prevent the diagram-barrel from slamming against its stop in its recoil movement.

In the accompanying drawings, Figure 1 is an elevation partly in section of the ordinary type of indicator with the attachment connected therewith in place of the ordinary leading off pulley; Fig. 2, a plan view partly in section of the same, and Fig. 3 a detached view, partly in section of the clutch mechanism engaged.

The parts representing the ordinary type of indicator are as follows: 2 is the steam cylinder carrying the pencil mechanism, 12 the diagram barrel, and 13 the connecting arm to which the attachment is secured by means of the nut 14, the base or support 15 of the attachment being interchangeable with the support of the ordinary leading off pulley.

The automatic clutch mechanism forming a part of the new attachment is the same as that referred to in said United States Letters Patent and consists of the fixed collar 5 secured to the shaft 6, the sliding collar 7 carrying the parallel pins 8 and 9, the clutch bolt extension 10 which is on or integral with the pin 8, the loose ring 11, the cord pulley 22, the cord on which has a hook, as usual, for attachment to a reciprocating part of the engine, the recoil spring 33 and connecting pin 44.

When the clutch bolt extension 10, is brought into engagement with one of the shoulders, 50, on the face of the hub, 49, of the pulley 22, by a movement of the sliding collar, 7, toward the pulley, the pulley will be clutched to the shaft 6.

In my present invention the worm on the shaft 6 does not engage with the diagram barrel directly, as shown in said patent, as this would require the addition of a toothed collar meshing with the worm, to the ordinary type of indicator, involving a reconstruction of the same,—one object of my present invention being to adapt the same to the ordinary diagram barrel without alteration of the latter.

The present invention, therefore, consists in an auxiliary barrel 16, constructed with a toothed ring 17 at its base that engages with the worm on the shaft 6 of the clutch mechanism. This barrel 16 is mounted upon a spindle 18, rotates freely thereon, and is connected to the diagram barrel of the indicator, by means of a cord 19, which encircles and is secured at one end to the diagram barrel at its base and to the auxiliary barrel by winding and securing it by passing it through one or more holes 20 or slots 21 and holding its free end by means of a flat spring 25 connected to the hub 23 of the barrel 16 as shown in Figs. 1 and 2.

When the cord-pulley 22, is clutched to the shaft 6, said pulley will be connected with the diagram-barrel by means of said shaft, the auxiliary barrel, and the cord 19.

As stated in said United States patent, in making the clutch engagement it is found desirable in practice to turn the diagram barrel slightly forward and clear of its recoil stop Z, so that when the clutch engagement is made the slight extra tension given to the cord that connects with the engine will prevent the diagram barrel from slamming against its recoil stop.

The means herein shown for the purposes consists of a loose knob or thumb piece 1 upon the projecting end of the spindle 18 and having a depending pin or stud 4 that engages when the thumb piece is turned with a corresponding pin 3 projecting from the hub 23 of the auxiliary barrel 16, the said pins being long enough for their ends to overlap, for such purpose.

When it is desired to make the clutch engagement the knob or thumb-piece 1 is first turned to bring the respective pins in contact and by a slight farther turn the diagram barrel is advanced clear of its recoil stop Z, and held by one hand in such position until the clutch engagement is made, with the other hand. The instant the clutch engagement is effected, the pins move away from each other, leaving the thumb piece stationary and free, while the diagram barrel oscillates in its operation.

In the present invention, if desired, the recoil stop Z on the diagram barrel may be dispensed with and the same applied to the auxiliary barrel, as shown at $x$, Figs. 1 and 2.

In applying my invention to the ordinary form of indicator already in use it is only necessary to remove therefrom the arm or support which carries the leading-off pulley and corresponds to the arm or support 15, and is held in place by the nut 14, and substitute the new attachment.

What I claim, and desire to secure by Letters Patent, is—

1. In combination with the rotary diagram-barrel of a steam-engine indicator, an attachment consisting of an arm or base having thereon a rotatable auxiliary barrel adapted to be connected by a cord to said diagram-barrel, so as to oscillate coincidently therewith, a cord-pulley in gear connection with said auxiliary barrel and adapted to be connected to a reciprocating part of an engine, and a clutch-mechanism for connecting and disconnecting said pulley, substantially as and for the purpose specified.

2. The combination, with the rotary diagram barrel of a steam-engine indicator, of an auxiliary barrel connected therewith by a cord, a cord-pulley in gear connection with the auxiliary barrel, clutch-mechanism for connecting and disconnecting said pulley, and means for slightly rotating the auxiliary barrel prior to the clutch engagement, substantially as and for the purpose specified.

3. In combination with the rotary diagram-barrel of a steam-engine indicator, an attachment consisting of an arm adapted to interchange with the usual leading-off pulley support, and having thereon a rotatable auxiliary barrel adapted for connection with the diagram-barrel so as to oscillate coincidently therewith, a cord-pulley in gear connection with said auxiliary barrel, clutch-mechanism for connecting and disconnecting the cord-pulley, and means for independently rotating the auxiliary barrel prior to the clutch engagement, substantially as set forth.

WILLIAM HOUGHTALING.

Witnesses:
MARTIN LUSCOMB,
N. P. FLYNN.